April 7, 1964
E. BRICHARD ETAL
3,127,680
APPARATUS FOR CUTTING SHEET GLASS
Filed Oct. 17, 1960
2 Sheets-Sheet 1
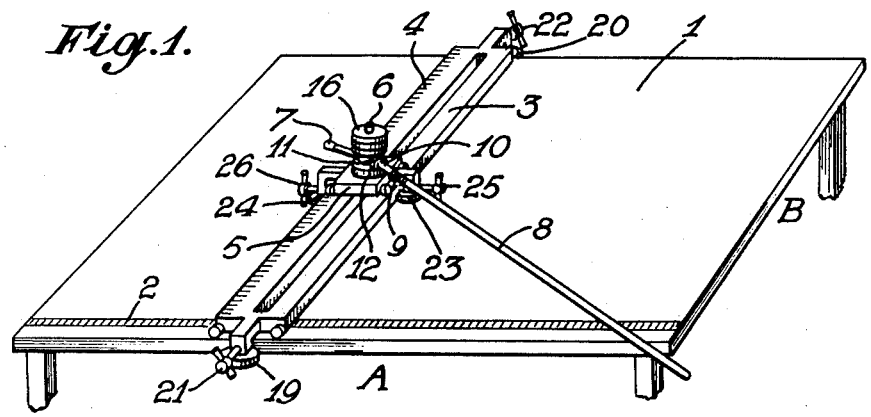
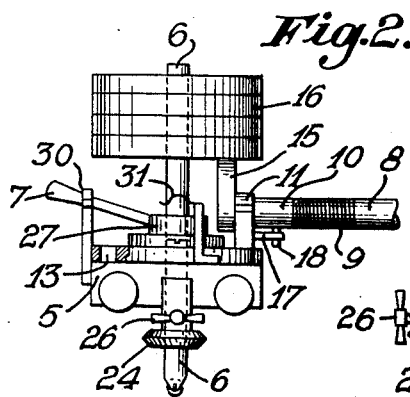 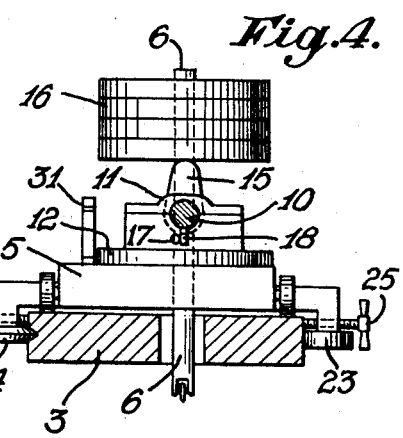
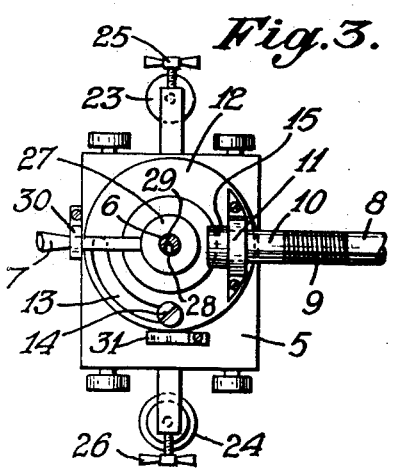 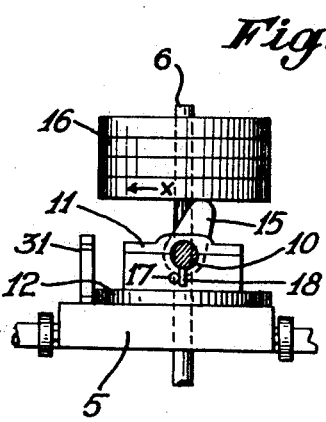
INVENTORS
EDGARD BRICHARD
MICHEL CHARUE
GEORGES SIMON
BY Corey, Hart & Stemple
ATTORNEYS April 7, 1964 E. BRICHARD ETAL 3,127,680
APPARATUS FOR CUTTING SHEET GLASS
Filed Oct. 17, 1960 2 Sheets-Sheet 2
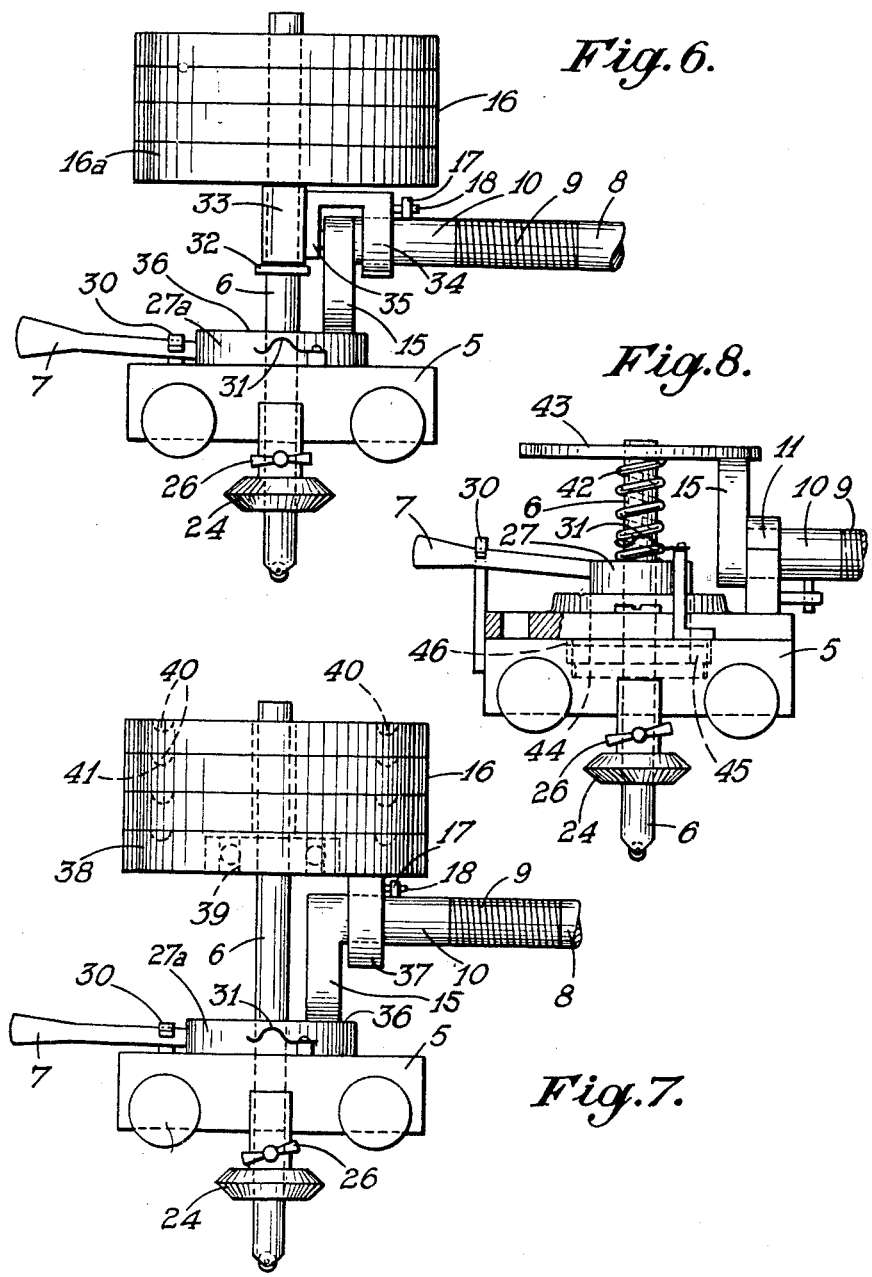
INVENTORS
EDGARD BRICHARD
MICHEL CHARVE
GEORGES SIMON
BY Corey, Hart & Stemple
ATTORNEYS United States Patent Office 3,127,680
Patented Apr. 7, 1964

3,127,680
APPARATUS FOR CUTTING SHEET GLASS
Edgard Brichard, Jumet, and Michel Charue and Georges Simon, Lodelinsart, Belgium, assignors to Union des Verreries Mecaniques Belges, Societe Anonyme, Charleroi, Belgium, a Belgian company
Filed Oct. 17, 1960, Ser. No. 62,980
Claims priority, application Belgium Nov. 13, 1959
14 Claims. (Cl. 33—32)

Various types of apparatus for cutting sheet glass on a table are known, in which systems for manual and semi-automatic cutting are provided.

These apparatus generally comprise a cutting tool adapted to move on the table along guides disposed parallel to the edges of the latter, generally in directions perpendicular to one another.

In the case of the manual control of the tool, the operator must generally grip the latter so as to lower it on to the sheet or to raise it. He must then follow it along the entire path on the cutting line.

These operations present serious difficulties by reason of the large dimensions of the glass sheets at present produced.

In effect, the operator must climb on to the table and walk over the glass if the sheet is of relatively large dimensions. This operation is slow and difficult and the operator does not succeed in following the tool over the entire width or length of the sheet. He must interrupt the cutting stroke at intervals and thereafter resume it after himself having changed position. This involves the risk of obtaining discontinuous or broken cutting lines, which result in breakage of the sheet. The work is slowed down and the operator is subjected to increased fatigue.

The main object of the invention resides in the use of a manipulating handle and advantageously a mechanism serving to bring the tool into the operating position and to disengage it from this position, the said handle and the said mechanism being combined with the assembly consisting of the tool and the tool carriage by means of an assembly device adapted to be angularly displaced, with the said handle and the said mechanism around the tool, and advantageously entirely around the tool, along at least one plane which is transverse in relation to the direction in which the tool is moved towards and away from the glass sheet.

The object of the invention further resides in that the manipulating handle may be connected to the device serving to bring the tool into and out of the operative position, by an advantageously resilient coupling such as, for example, a spring.

The invention affords the great advantage that it enables the operator to manipulate the tool both in the horizontal direction and in the vertical direction from any point along the periphery of the table.

The particular advantage of the resilient coupling of the handle, for example by means of a spring, to the device serving to bring the tool into and out of the operating position resides in that such a coupling possesses sufficient rigidity for ensuring, at the very commencement of the operation, an immediate angular drive of the system adapted to be angularly displaced around the tool, and the possibility of ready vertical displacement of the handle in all the positions of the latter.

A number of constructional forms of the cutting apparatus according to the invention are diagrammatically illustrated by way of example in the accompanying drawings, in which:

FIGURE 1 is a view in perspective of a table of known type combined with a device for manipulating the tool constructed in accordance with the present invention, FIGURES 2 to 5 illustrate details of the constructional example of FIGURE 1, namely:

FIGURE 2 is an elevational view of the tool carriage with its manipulating device, FIGURE 3 is a plan view of the arrangement illustrated in FIGURE 2, FIGURE 4 is an end view of the tool carriage with its manipulating device, resting on the slideway displaceable on the cutting table, FIGURE 5 is an end view similar to that of FIGURE 4, showing a modified constructional form of the manipulating device, and FIGURES 6, 7 and 8 show three other constructional variants of the invention.

The table 1 supports on its forward edge a graduated scale 2. Mounted on the said table is a slideway or carrier in the form of a straight edge 3 adapted to be shifted on the table from one lateral edge B of the latter to the other. The slideway 3 bears a graduated scale 4 and supports a tool carriage 5 movable along its length. The guiding and the keying of the slideway on the table and of the tool carriage on the slideway at the desired points of the respective graduations, in accordance with the dimensions to which the glass is to be cut, are effected, for example, by means of guide rollers and pressure screws 19, 20, 21, 22, 23, 24, 25, 26, respectively (see FIGURES 1 and 4).

The cutting tool 6 is mounted on the tool carriage 5 in such manner as to be displaceable towards and away from the glass sheet and angularly around the longitudinal axis of its stem, its angular displacement being effected with the aid of a handle 7 fast with a cylindrical sleeve 27 slid with gentle friction on to the stem of the tool 6 and adapted to drive the latter in an angular direction through the mortise-and-tenon joint 28—29, which does not, however, prevent the axial displacement of the tool in the sleeve 27 and in the tool carriage 5, on which the said sleeve can freely rest. The handle 7 thus permits of orienting the tool 6 in the direction of the cutting line to be scored, the assembly 6, 7, 27, 28, 29 being adapted to be keyed in the chosen orientation by means known per se, such as for example spring abutments 30, 31 or by buttressing, etc.

A spring 42 (FIGURE 8) or a mass 16 (FIGURES 1 to 7) applies the tool against the glass sheet with the necessary pressure.

In the embodiment of the invention as illustrated in FIGURES 1 to 5, the tool carriage 5 is connected to a handle 8, for example through a flexible coupling such as a helical spring 9, by means of which it is possible to control the movements of the tool carrier without having to hold the handle 8 in the direction of the translational movement of the tool. The coupling spring 9 makes it possible to move the handle 8 angularly both in a vertical direction and in a horizontal direction or in an oblique direction during the work.

The flexible coupling 9 is fixed at one end to the end of the handle 8 and at the other end to a pivot 10 adapted to pivot in a bearing 11 mounted on a turret 12. The latter consists of a centrally apertured plate slide with gentle friction on the sleeve 27 and resting on the tool carriage 5, on which it can turn freely about the sleeve 27.

The turret 12 is formed with a slot 13 extending circumferentially along an arc of a circle of 90° and is maintained on the carriage 5 by the screw 14, which serves at the same time as an abutment for the ends of the slot 13.

The pivot 10 is fast with a cam 15, on which there rests the mass 16 fast with the stem 6 of the tool. The profile of the cam 15 is such that when the mass 16 rests on the end of the large radius of the cam, the tool 6 is in the inoperative position.

When the cam 15 is turned from this position by means of the handle 8, it causes the mass 16 and the tool 6 to descend, so that the latter can come into contact with the glass, and the mass, which no longer rests on the cam, rests by its whole weight on the tool, thereby exerting on the latter a pressure which is adjusted by varying the weight of the mass 16 by adding or removing small metal annuli making up at least part of the mass.

Abutments 17 and 18 fixed to the bearing 11 and to the pivot 10 respectively stop the latter when the cam 15 is raised by a rotation of the handle 8.

It may happen that during a change in the orientation of the cutting tool in the direction indicated by the arrow X in FIGURE 5 the rotation of the mass 16 drives the cam 15 and thus produces an untimely and violent descent of the tool on to the glass.

In order to avoid this disadvantage, it is advantageous to dispose the abutments 17 and 18 as illustrated in FIGURE 5, that is to say, in such manner that when the cam 15 is in the raised position its large radius extends beyond the vertical, so that the cam is thus automatically maintained in this raised position by the pressure of the mass 16.

With the glass sheet resting on the table and the cutting tool occupying its raised position, the apparatus is employed as follows:

In order to cut the sheet lengthwise, that is to say, in order to score the cutting line or lines parallel to the edge A (FIGURE 1) of the table, the operator brings the slideway 3 with the tool carriage 5 by means of the handle 8 to the edge B of the table, which can readily be done regardless of its position, since the handle 8 is connected to the tool carriage 5 by the turret 12, which is adapted to turn about the tool while being attached to the said turret by the flexible link 9. He can then readily turn the tool 6 in the direction for longitudinal cutting by means of the handle 7, whereafter he locks the tool carriage 5 on the slideway 3 with the aid of the pressure screws 25, 26 opposite that graduation on the slideway 3 which corresponds to the dimension to which the glass is to be cut.

Again by means of the handle 8, he then pushes the slideway 3 with the tool carrier towards that edge of the sheet which is opposite to the edge B, turns the handle 8 through a quarter of a turn in order to lower the tool on to the glass and scores the cutting line by bringing the assembly comprising the slideway and the carriage towards the edge B with the aid of the handle 8, which can be done regardless of its position compatible with the sum of the angles corresponding on the one hand to the axis embraced by the slot 13 in the turret 12 and on the other hand to the useful lateral displacement permitted by the coupling spring 19, as also with the position of the handle 7.

He then raises the tool by turning the handle 8 in the opposite direction and fixes the carriage 5, if desired opposite another graduation on the slideway 3, if the sheet must be delivered in the form of a number of longitudinal strips.

In order to cut the sheet transversely, parallel to the edge B, the operator brings the tool carrier 5 to the end of the slideway 3 nearer the edge A of the table and turns the tool with the aid of the handle 7 in the transverse direction.

He thereafter positions the slideway 3 opposite that graduation of the scale 2 which corresponds to the dimension to which the glass is to be cut and he locks it on the table 1 in this position with the aid of pressure screws 21, 22. He thereafter pushes the tool carrier 5 to the opposite edge of the sheet, lowers the tool 6 on to the glass by a quarter of a turn of the handle 8 and scores the line by bringing the carriage towards the edge A with the aid of the handle 8. The operation can thereafter be recommenced at another graduation.

FIGURES 6 and 7 show two other embodiments of the invention, in which the handle 8, the flexible coupling 9 connecting it to the pivot 10 of the cam 15, as also the two latter members and their support are adapted to turn around the tool 6 to an unlimited extent.

In the embodiment illustrated in FIGURE 6, a stop ring 32 fast with the stem 6 maintains this sleeve 33 against the lower face of the mass 16, the said sleeve 33 being capable of turning freely around the stem 6 but being prevented from sliding axially thereon by the abutment 32 and by the lower discs 16a supporting the mass 16 and axially fast with the mass.

Bearings 34, 35 are fixed to the sleeve 33 and support the pivot 10 provided with the cam 15, connected to the handle 8 by the flexible link 9.

The turret 12 previously described is omitted and in this case the sleeve 27 is in the form of a disc 27a, of which the upper face 36 extends below the cam 15.

If, starting from the position illustrated in FIGURE 6, the handle 8 is turned, the cam 15 pushed on to the surface 36 causes the tool 6 to rise owing to the thrust exerted by the sleeve 33 on the lower disc 16a of the mass 16, which is fast with the tool 6.

In accordance with FIGURE 7, the bearing 37 on which the pivot 10 and consequently the assembly consisting of the cam 15, the link 9 and the handle 8 is mounted, is fixed directly to the lower disc 38 supporting the mass 16. In this case, it is necessary for the lower disc 38 to be able to turn freely with the assembly 8, 9, 10, 15, 37, 36 about the vertical stem 6 of the tool without angularly driving the latter, since the tool must remain in the chosen cutting direction. For this reason, the lower disc 38, which may be integrally formed with the mass 16, or may be separated therefrom (as illustrated) if the mass is formed of stacked annuli permitting of varying the pressure exerted on the tool 6, consists of a horizontal ring centred on the stem 6 and axially retained thereon by means of a bearing 39.

The bearing 37 supporting the pivot 10 is fixed to the lower face of the ring 38. The cam 15, which is fast with the pivot 10, is situated above the upper face 36 of the disc 27 as in the case of FIGURE 6.

The upper face of the ring 38 extends slightly beyond the bearing 39 so that the mass 16, or the annuli of which it is composed, which rest on the ring 38, cannot come into contact with the fixed central portion of the bearing 39.

Finally, in order that the mass or the annuli 16 may remain well centered and in order that they may not rub against the stem 6, they are provided on their lower face with bosses or beads 40 penetrating into the cavities 41 formed in their upper face and in the upper face of the ring 38.

In the two embodiments according to FIGURES 6 and 7, as in those according to FIGURES 2 to 5, abutments 17 and 18 are provided to stop the pivot 10 when the tool 6 is in the raised position.

The pressure of the tool on the glass, instead of being produced in the manner hereinbefore described, can be produced in accordance with the invention by means of a spring stretched between the upper portion of the stem 6 and the carriage 5 or the sleeve 27.

FIGURE 8 shows a constructional form adapted to the embodiment of the invention as illustrated in FIGURES 2 to 5.

According to FIGURE 8, a traction spring 42 disposed around the stem 6 is fixed at one end to the sleeve 27 and at the other end to an annulus 43 secured to the top of the stem 6, desirably in pivoted fashion. In this constructional form, the sleeve 27 is axially retained on the carriage 5, for example by virtue of the fact that it is provided with a base 44 in the form of a flange, retained by a ring 45 in a recess 46 formed for this purpose in the upper face of the tool carriage 5.

The graduations such as 2 and 4, instead of being provided on one of the edges of the table 1 and of the slideway 3, may naturally be provided on the two respective opposite faces of the table and of the slideway, so as to permit the operator to fix the respective positions of the slideway on the table and of the tool carriage on the slideway by positioning himself at will at one of the four edges of the table and carrying out the cut in the desired direction, owing to the fact that he can shift the handle freely around the tool.

The present invention is not limited to the constructional examples of its subject as hereinbefore described and as illustrated in the accompanying drawings, since it lends itself to many constructional variations, which are all covered by the invention.

We claim:

1. Apparatus for cutting sheet glass on a table, comprising a rail, a carriage movably mounted on said rail, a glass cutting tool, means supporting said tool on said carriage for linear movement toward and away from a glass sheet resting on the table and for angular movement about the line of said linear movement, means for rotating said tool about said line as an axis and for setting the same at a desired angle in relation to said glass sheet, and actuating means for moving said carriage on said rail and for manipulating said tool at a place remote from said carriage, said actuating means including an elongated handle, means connected to said handle and operable by the latter to move said tool along said line into and out of engagement with the glass sheet without disturbing the angular setting given said tool by said rotating and setting means, and means connecting said handle to said carriage for angular movement of said handle about said line and tool, without disturbing such given angular setting of the latter whereby said tool may be operated by said handle at a number of positions of the latter disposed around said line as an axis without disturbing the angular setting given such tool by said rotating and setting means.

2. Apparatus for cutting sheet glass such as defined in claim 1, in which said conecting means for said handle comprises a member rotatably mounted for movement about the longitudinal axis of said tool, a pivotal support carried by said rotatable member and movable therewith about the tool, a member pivotally mounted on said pivotal support, and flexible means connecting said handle to said pivoted member, and is which said operable means comprises a cam member mounted on said pivoted member, and means mounted on said tool and movable by said cam member to move said tool along said line of movement.

3. Apparatus for cutting sheet glass such as defined in claim 2, in which said handle connecting means includes means for locking said rotatable member on said carriage with said pivotal support in a given angular relation to said tool.

4. Apparatus for cutting sheet glass such as defined in claim 2, in which said rotatable member is mounted on said tool and forms part of said operable means to move said tool along said line of movement, and in which said cam is located between said rotatable member and a cam engageable surface on said carriage fixed against movement along said line of tool movement.

5. Apparatus for cutting sheet glass such as defined in claim 2, in which said cam movable means mounted on said tool comprises a weight mass normally urging said tool into engagement with the glass sheet, said cam member being operable by said handle to lift said weight mass in the withdrawal of said tool from the glass sheet.

6. Apparatus for cutting sheet glass such as defined in claim 2, in which said means mounted on said tool comprises a disc secured to said tool and engageable by said cam to move said tool in one direction of said line of movement, and a spring connected at one end to said disc and connected at its other end to a fixed part on said carriage and urging movement of said tool in the other direction of said line of movement.

7. Apparatus for cutting sheet glass such as defined in claim 2, including cooperative abutment members provided on said pivotal support and on said pivoted member to limit angular displacement of said cam member by said handle.

8. Apparatus for cutting sheet glass such as defined in claim 4, in which said rotatable member comprises a sleeve rotatably mounted on said tool, and said operable means includes means fixed to said tool for preventing longitudinal movement of said sleeve on said tool.

9. Appparatus for cutting sheet glass such as defined in claim 4, in which said rotatable member comprises a disc, and in which said operable means comprises bearing means rotatably supporting said disc on said tool.

10. Apparatus for cutting sheet glass such as defined in claim 4, in which said cam movable means mounted on said tool comprises a weight mass supported by said rotatable member and normally uring said tool into engagement with the glass sheet, said cam member being operable by said handle and through said pivotal support and said rotatable member, to lift said weight mass in the withdrawal of said tool from the glass sheet.

11. Apparatus for cutting sheet glass such as defined in claim 10, in which said weight mass comprises a plurality of members centered with relation to each other and with relation to said rotatable member.

12. Apparatus for cutting sheet glass such as defined in claim 10, in which said weight members are rotatably mounted on said tool and can turn freely with said rotatable member.

13. Apparatus for cutting sheet glass such as defined in claim 7, in which said cam member is so arranged with relation to the abutment member on said pivoted member that when such abutment members are in engagement, the cam will occupy a position beyond that required to withdraw the tool to its fully withdrawn position in the same direction, thereby locking the tool in such position until the cam member is positively actuated by the handle to release the same.

14. Apparatus for cutting sheet glass on a table, comprising a movable rail, a carriage movably mounted on said rail, a vertically disposed glass cutting tool having a glass cutting element at its lower end, means intermediate the ends of said vertical tool for supporting the same on said carriage for vertical movement toward and away from a glass sheet resting on the table and for angular movement about the vertical axis of said tool, means for rotating said tool about its vertical axis and for setting the cutting element thereof at a desired angle in relation to the glass sheet, and actuating means for moving said carriage on said rail and for manipulating said tool at a place remote from said carriage, said actuating means comprising an elongated handle, means connecting said handle to said carriage for angular movement of said handle about said vertical axis without disturbing the angular setting given said tool by said rotating and setting means, and means operable by said handle to move said tool along said vertical axis without disturbing such given angular setting of the latter, said connecting means including a member mounted for rotational movement about said vertical axis, and means movably connecting said handle to said rotatable member, and said operable means including a cam member connected to said handle and mounted for rotatable movement about an axis transverse to said vertical axis, and a disc-shaped member mounted on said tool and movable vertically by said cam member to vertically move said tool.

References Cited in the file of this patent

UNITED STATES PATENTS

| | | |
|---|---|---|
| 1,100,878 | Higgins et al. | June 23, 1914 |
| 1,140,143 | Falvey | May 18, 1915 |
| 1,707,914 | Lampe | Apr. 2, 1929 |
| 1,785,496 | Rowley | Dec. 16, 1930 |